United States Patent [19]
Carroll et al.

[11] Patent Number: 5,169,529
[45] Date of Patent: Dec. 8, 1992

[54] LIQUID MEMBRANE MODULES WITH MINIMAL EFFECTIVE MEMBRANE THICKNESS AND METHODS OF MAKING THE SAME

[75] Inventors: Robert H. Carroll, Rock Hill, S.C.; Terry A. Barber, Charlotte; Bradley W. Reed, Gastonia, both of N.C.

[73] Assignee: Hoechst Celanese Corporation, Charlotte, N.C.

[21] Appl. No.: 688,180

[22] Filed: Apr. 22, 1991

[51] Int. Cl.$^5$ ............................................. B01D 61/38
[52] U.S. Cl. .......................... 210/321.78; 210/321.87; 210/500.23
[58] Field of Search ...................... 210/500.23, 500.28, 210/643, 644, 648, 321.78, 321.87; 55/16, 158; 264/258

[56] References Cited

U.S. PATENT DOCUMENTS

| | | | |
|---|---|---|---|
| 3,342,729 | 9/1967 | Strand | 210/23 |
| 3,557,962 | 1/1971 | Kohl | 210/321 |
| 3,794,468 | 2/1974 | Leonard | 23/258 |
| 4,087,327 | 5/1978 | Feder et al. | 435/285 X |
| 4,308,654 | 1/1982 | Bogart | 55/16 X |
| 4,460,641 | 7/1984 | Barer et al. | 428/246 |
| 4,750,918 | 6/1988 | Sirkar | 55/16 |
| 4,789,468 | 12/1988 | Sirkar | 210/137 |
| 4,940,617 | 7/1990 | Baurmeister | 428/36.3 |

FOREIGN PATENT DOCUMENTS

| | | |
|---|---|---|
| 0093677 | 9/1983 | European Pat. Off. |
| 0264696 | 10/1987 | European Pat. Off. |
| WO83/00098 | 1/1983 | PCT Int'l Appl. |

OTHER PUBLICATIONS

"A New Liquid Membrane Technique for Gas Separation", Aiche Journal, Jul. 88, vol. 34, No. 7, Majumdar et al.
"Separation of Solutes from Aqueous Solutions by Contained Liquid Membranes", Aiche Journal, Oct. 88, vol. 34, No. 10, Sengupta et al.
"Selective Separations Using Contained Liquid Membranes", Basu et al., Dept. of Chem. & Chem. Eng., Stevens Inst. of Technology, Hoboken, N.J.
"Hollow Fiber Contained Liquid Membrane Separation of Citric Acid", Basu et al., Dept. of Chem. & Chem. Eng. Center . . . , Hoboken, N.J.
"Mass Transfer With Contained Liquid Membranes", Nguyen et al., Hoechst Celanese Separations Products Division, Charlotte, N.C.
"Penicillin Separations With Contained Liquid Membranes", B. V. Sorenson, Hoechst Celanese Corporation, Charlotte, N.C.
"A Two-Dimensional Analysis of Membrane Thickness in a Hollow-Fiber-Contained Liquid Membrane Permeator", Majumdar et al., Journal of Membrane Science, 43 (1989) 259-276.
"Separation of Ethylene from EthanE . . . ", Teramoto et al., Journal of Membrane Science, 45 (1989) 115-136.

Primary Examiner—Frank Spear
Attorney, Agent, or Firm—Kenneth A. Genoni; Jay M. Brown; Bryan H. Davidson

[57] ABSTRACT

Modules for use in fluid separations, especially contained liquid membrane separations, exhibit minimal effective membrane thickness. The modules have a module case and bundle of a dense plurality of hollow fiber membranes contained in the case. One set of the fiber membranes in the bundle constitutes feed-fibers while another set of the fiber membranes in the bundle constitutes strip-fibers for use in contained liquid membrane separations. The feed-fibers and strip-fibers are disposed within the elongate module case in opposite generally wave-like paths such that the feed-fibers and strip-fibers converge at generally lengthwise-separated crossing regions within the module. This disposition of the feed-fibers and the strip-fibers minimizes the effective membrane thickness value of the module as compared to conventional contained liquid membrane modules thereby enhancing the efficacy of fluid separations.

9 Claims, 3 Drawing Sheets

LIQUID MEMBRANE MODULES WITH MINIMAL EFFECTIVE MEMBRANE THICKNESS AND METHODS OF MAKING THE SAME

RELATED APPLICATIONS

This application is related to commonly owned and copending U.S. application Ser. Nos. 07/688,179 and 07/688,178, filed on even date herewith and entitled the same as this application, the entire contents of each application being expressly incorporated hereinto by reference.

BACKGROUND AND SUMMARY OF THE INVENTION

It has recently been suggested that microporous hollow fibers (MHF) may be employed in a liquid membrane separation technique whereby feed and sweep gases flow through the lumens of two different sets of hydrophobic MHF (designated feed-fibers and sweep-fibers, respectively), while a liquid on the shell side of the MHF serves as the membrane. See generally, Majumdar et al, "A New Liquid Membrane Technique for Gas Separation", AICHE Journal, vol. 34, No. 7, pages 1135-1145 (1988), and Sengupta et al., "Separation of solutes from Aqueous solutions by Contained Liquid Membranes", AIChE Journal, vol. 34, no. 10, pages 1698-1708 (1988), the entire content of which is expressly incorporated hereinto by reference. This so-called "contained liquid membrane" (CLM) technique is reported to have several advantages over conventional immobilized liquid membrane (ILM) separation technology.

For example, conventional ILM technology typically requires periodic replacement of the immobilized membrane liquid due to solute saturation, depletion and/or contamination (depending upon the type of separation being conducted). As a result, conventional ILM technology is typically only limited to batch separation processing. However, since the membrane liquid according to the recently proposed CLM technique is physically present in the shell-side of a separation module, it may be replenished and/or replaced more or less continually thereby allowing separation processing to be accomplished on an essentially continuous basis.

Modules for performing CLM separation processes typically include a bundle of microporous hollow fibers divided approximately equally into a set of feed-fibers (through which the feed fluid flows), and a set of strip-fibers (through which the strip fluid flows). The MHF bundle is physically housed within a module case of desired size and configuration such that the lumens of the feed- and strip-fibers are in fluid-communication with supply and discharge ports of the module case associated with the flow of feed and strip fluids, respectively. In this manner, a cocurrent or countercurrent gas flow through the respective sets of feed- and strip-fibers within the module case may be established.

Theoretically, when performing CLM separations, each of the feed-fibers should be in an immediately adjacent non-contacting relationship to a respective one of the strip-fibers so that the distance therebetween is filled with the membrane liquid. According to this ideal configuration, therefore, a theoretical minimum effective membrane thickness (EMT) is established whereby the closest packing of the feed and strip fibers is achieved so that the distance therebetween is minimized. However, conventional module manufacturing techniques fall far short of the theoretical minimum EMT since individual feed-fibers cannot exactly and reliably be interposed with individual strip-fibers. As a result, groupings of feed-fibers will reside in the module adjacent to groupings of strip-fibers thereby significantly increasing the module EMT over the theoretical minimum value.

In addition, conventional module manufacturing techniques invariably cause feed- and strip-fibers to physically contact one another along substantial extents of the fiber length within the module. As briefly noted above, significant surface contact between feed- and strip-fibers is disadvantageous in CLM separations because effectively no membrane is present between those fibers in contact with one another, a condition which again contributes to significant increases of the module EMT over the theoretical value.

It is towards providing solutions to the above problems that the present invention is directed. Broadly, therefore, the present invention is directed to modules containing hollow fiber membranes adapted to being used for contained liquid membrane separations which exhibit effective membrane thicknesses which are closer to the theoretical value than can be obtained using conventional membrane manufacturing techniques.

More specifically, the present invention is directed to modules having a module case and a bundle of hollow fiber membranes therein which are segregated into feed- and strip-fibers. Important to the present invention, the feed- and strip-fibers in the bundle alternate one with the other so that a selected feed-fiber or strip-fiber will respectively be interposed between an adjacent pair of strip-fibers and feed-fibers. As a result, disposition of the feed-fibers and strip-fibers within the module case is significantly closer to an ideal (theoretical) arrangement with the beneficial result being that greater CLM separation efficiencies may be achieved.

The individual feed-fibers and strip-fibers in the microporous hollow fiber bundle are each generally disposed along respective wave-like (e.g., generally sinusoidal) paths within the module case. That is, the individual feed-fibers and strip fibers will converge upon one another at spaced-apart crossing regions, and will arcuately diverge therefrom in opposite directions. Thus, the sets of feed-fibers and strip-fibers each respectively conform generally to sinusoidal paths within the module case, but are physically out-of-phase 180° with one another. In addition, the individual feed-fibers and strip-fibers will alternate with one another as mentioned briefly above so as to minimize (if not prevent entirely) forming clusters of feed-fibers or strip-fibers (which would therefore increase the effective membrane thickness of the module as noted previously).

The modules of this invention are preferably produced using a jig which establishes the generally sinusoidal paths for each of the feed-fibers and strip-fibers. A continuous length of microporous hollow fiber may therefore be unwound from its spool by effecting relative manipulation between the jig and the spool so as to cause the length of microporous hollow fiber to be positioned in the jig along the respective paths of the feed- and strip-fibers (i.e., so that the feed- and strip-fibers assume their generally opposite sinusoidal disposition).

The feed- and strip-fibers are then positionally restrained on the jig so their general sinusoidal disposition is preserved such that they can later be removed from the jig as a coherent bundle. In this connection, the feed- and strip-fibers are most preferably restrained by means of banding the fibers at each of the crossing regions and then removing the thus banded fiber bundle from the jig. Alternately, when polyolefin hollow fiber membranes are employed, the fibers may be subjected to heat-treatment so as to set the fibers in their position on the jig.

Further aspects and advantages of this invention will become more clear after careful consideration is given to the detailed description of he preferred exemplary embodiments thereof which follows.

BRIEF DESCRIPTION OF THE ACCOMPANYING DRAWINGS

Reference will hereinafter be made to the accompanying drawings wherein like reference numerals throughout the various Figures denote like structural elements, and wherein.

DETAILED DESCRIPTION OF THE PREFERRED EXEMPLARY EMBODIMENTS

Figure 1:
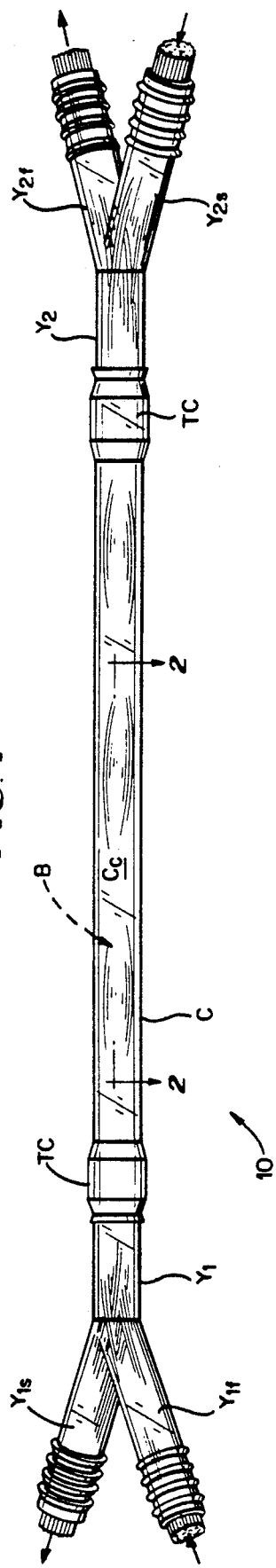
FIG. 1 is a side perspective view of a module according to the present invention which is partly sectioned to expose the superposed pleated fabric layers contained within the module case.

Accompanying FIG. 1 depicts a preferred embodiment of a contained liquid membrane module 10 according to the present invention. In this connection, the module 10 includes a case C and a microporous hollow fiber bundle B disposed within the interior space S (see FIG. 2) of the case.

Figure 2:
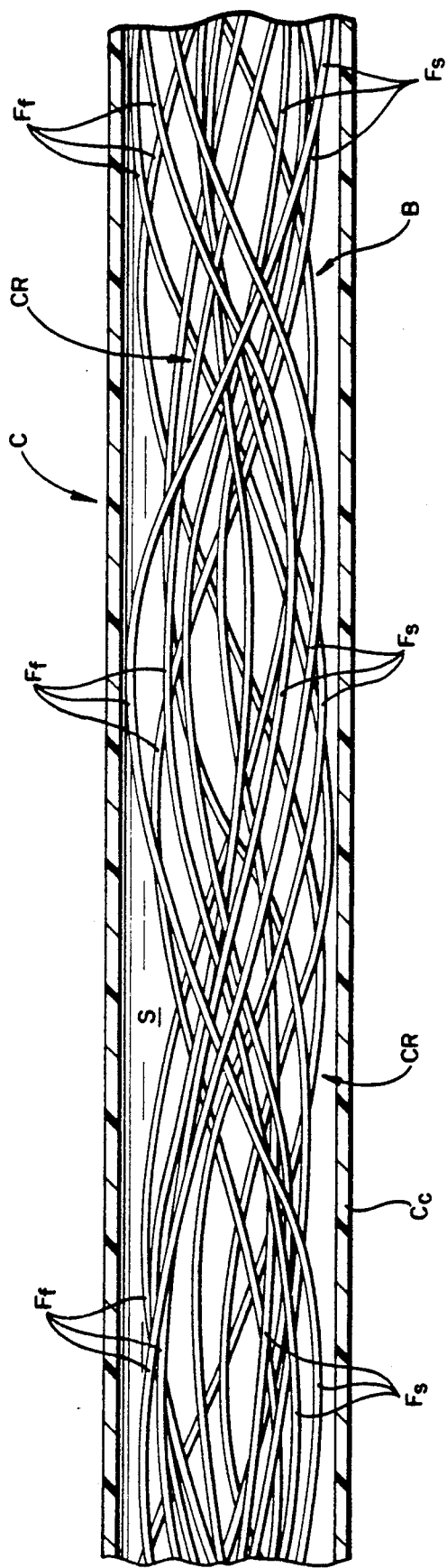
FIG. 2 is a partial cross-sectional view of the module shown in FIG. 1 as taken along line 2—2 therein, but in a greatly enlarged manner for clarity of presentation.

As is more clearly seen in the expanded scale of FIG. 2, the bundle B within the case C is comprised of a dense plurality of alternating feed-fibers and strip-fibers (a few of which are identified in FIG. 2 as $E_f$ and $F_s$, respectively). The lumens of the feed-fibers $F_f$ thus provide a path through which a feed fluid may flow, whereas the lumens of the strip-fibers $F_s$ provide a path through which the strip fluid may flow when the module 10 is placed into service during contained liquid membrane separations.

As will also be observed in FIG. 2, the feed- and strip-fibers $F_f$ and $F_s$ each are in the form of an alternating generally opposite (i.e., physically out-of-phase) sinusoidal arrangement such that a feed-fiber $F_f$ is interposed between an adjacent pair of strip-fibers $F_s$ throughout the depth of the interior space S within the case C (i.e., out of the plane of FIG. 2). Moreover, due to the opposite generally sinusoidal disposition of the feed fibers $F_f$ and strip fibers $F_s$, they will cross one another approximately at longitudinally (i.e., relative to the lengthwise dimension of the fibers—and hence the module) crossing regions CR.

The module case C is most preferably comprised of a elongate central tube $C_c$ and a pair of Y-configured end tubes $Y_1$ and $Y_2$ which are coupled to a respective end of the central tube $C_c$ by means of axial tube connectors TC. The terminal ends of the feed- and strip-fibers $F_f$ and $F_s$ will thus be separated one from the other and disposed within a respective branch of each of the Y-configured tubes. As a result, the lumens of each of the microporous hollow feed- and strip-fibers $F_f$ and $F_s$, respectively, may be connected to a fluid source. That is, the terminal ends of the microporous hollow feed-fibers $F_f$ may be disposed within branch $Y_{1f}$ of Y-configured tube $Y_1$ while the opposite terminal ends of the feed-fibers $F_f$ may be disposed within branch $Y_{2f}$ of Y-configured tube $Y_2$. Similarly, the terminal ends of the strip-fibers $F_s$ may be disposed within branches $Y_{1s}$ and $Y_{2s}$, respectively, of Y-configured tubes $Y_1$ and $Y_2$. In this manner, therefore, the branches, $Y_{1f}$, $Y_{2f}$, $Y_{1s}$ and $Y_{2s}$ serve as supply and discharge ports for the fluid during separation processes in dependence upon the desired relative flow through the module 10. For example, countercurrent fluid flow is depicted in FIG. 1, but cocurrent fluid flow is similarly possible. Likewise, a number of modules 10 may be fluid-connected in series so as to perform the desired separation.

Virtually any hollow fiber having walls which exhibit permeability with respect to the selected chemical species desired to be separated may be employed in the modules 10 according to the present invention. Thus, as used herein and in the accompanying claims, the term "hollow fiber membrane" and like terms are intended to refer to hollow fibers whose walls are permeable to a selected chemical species. Thus, hollow fibers which are physically permeable (e.g., due to the presence of pores in the hollow fiber walls) and/or hollow fibers that are chemically permeable (e.g., due to the mass transport of a chemical species through the hollow fiber walls) are included within the meaning of this definition.

Preferably, however, the hollow fiber membranes employed in the modules of this invention are microporous hollow fibers made by the "up-spinning" techniques disclosed in U.S. Pat. Nos. 4,405,688 and 4,451,981, each in the name of James J. Lowery et al., and each being expressly incorporated hereinto by reference. Briefly, non-porous precursor hollow fibers are produced according to the techniques disclosed in these prior patents by melt spinning the precursor fibers in a substantially vertically upward direction (i.e., up-spinning). The thus melt spun hollow precursor fibers are then spin-oriented while subjecting them to a symmetrical quenching step using a hollow annular structure surrounding the precursor fiber which has one or more openings on its inner surface that distribute the quenching medium against the precursor fiber in a substantially uniform manner. The thus formed hollow precursor fiber may then be heat annealed by, for example, subjecting the non-porous precursor hollow fiber to a temperature of between about 5° C. to 100° C. for a time period of at least a few seconds (e.g., from a few seconds up to about 24 hours, preferably between about 30 minutes to about 2 hours).

The finished microporous hollow fibers will possess an average inner diameter in the range of from about 5 to about 1500 microns, and preferably in the range of from about 70 to about 1500 microns. The fibers are moreover characterized by a substantially uniform internal diameter (I.D.), for example, a coefficient of variation in inner diameter through a cross-section taken perpendicular to the axis of the fiber of less than about 8%, preferably less than about 5%, and more preferably less than about 3%.

The pores of the preferred microporous hollow fibers are essentially interconnected through tortuous paths which may extend from one exterior surface or surface region to another, i.e., open-celled. Further, the pores of the preferred microporous hollow fibers of the present invention are microscopic, i.e., the details of the pore configuration or arrangement are described only in terms of microscopic dimensions. Thus, the open cells or pores in the fibers are smaller than those which can be measured using an ordinary light microscope, because the wavelength of visible light, which is about 5,000 Angstroms, is longer than the longest planar or surface dimension of the open cell or pore. The pore size of the microporous hollow fibers may be defined by using electron microscopy techniques which are capable of resolving details of pore structure below 5,000 Angstroms or by mercury porosimitry techniques.

The average effective pore size of the microporous hollow fibers useable in the practice of this invention is preferably between 50 to 2000 Angstroms, and more typically between 100 to 1000 Angstroms. By "average effective pore size" is meant the smallest dimension of a pore which would allow a generally spherical particle of that same dimension to pass therethrough. The pores generally have an elongated shape with a width of from 50 to 2000 Angstroms, and a length of from 500 to 10,000 Angstroms. Hence, the "average effective pore size" of the preferred microporous hollow fibers will usually be determined by the width dimension of the pores. These pores will, moreover, be fairly uniform around the circumference of the fiber. For example, the preferred microporous hollow fibers will exhibit an average ratio of the maximum pore density to the minimum pore density around the circumference of the fiber of less than about 3:1, and usually less than about 2:1.

Microporous hollow fibers of the type described above are commercially available from Hoechst Celanese Corporation, Separations Products Division, Charlotte, N.C. under the registered trademark CELGARD®.

Figure 3:
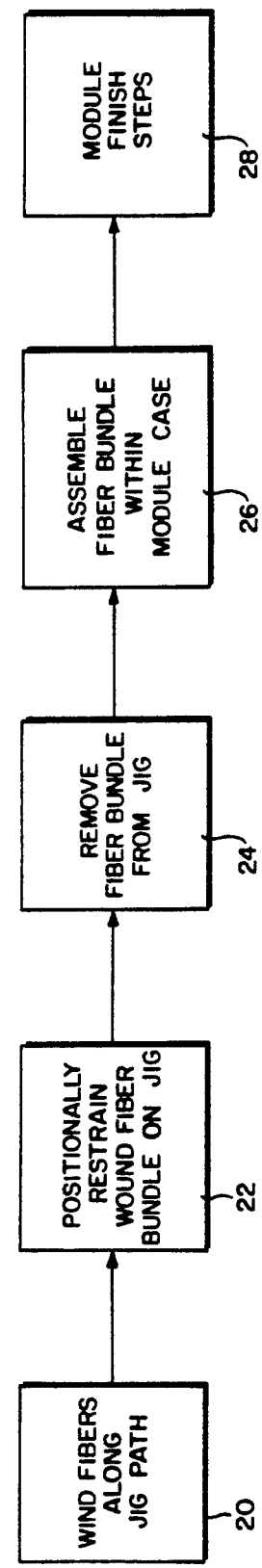
FIG. 3 is a block diagram illustrating the basic manufacturing steps employed in making the modules of the present invention.

Accompanying FIG. 3 shows in block fashion the principal fabrication steps employed to make the module 10 described above. As is seen, at least one continuous length of microporous hollow fiber is wound along the path established by means of a winding jig WJ (see FIG. 4 to be discussed in greater detail below). In this connection, it is especially preferred to use a multi-filament supply of hollow fiber membranes (e.g., a spool containing a desired number of continuous lengths of hollow fiber membranes concurrently wound thereon).

Once the desired number of feed-fibers $F_f$ and strip fibers $F_s$ have been positionally disposed along their respective paths established on the winding jig WJ, the bundle of feed-fibers and strip-fibers $F_f$ and $F_s$, respectively, are then positionally restrained in step 22 on the winding jig WJ. This is most conveniently accomplished by wrapping a band of suitable material about the fibers $F_f$ and $F_s$ at their lengthwise-separated crossing regions CR. Alternately, if the fibers $F_f$ and $F_s$ are formed of a heat-anealable resin (e.g., a polyolefin, such as polyethylene or polypropylene), then the entire winding jig WJ with the wound fiber bundle B thereupon may be placed physically as a unit within a heat-anealing oven so that the bundle of fibers $F_f$ and $F_s$ retain their generally sinusoidal configuration when removed from the jig.

As an example, when hollow fiber membranes formed of polypropylene are employed as the feed-and strip-fibers $F_f$ and $F_s$, they may be subjected to heat-annealing conditions of about 140° C. for a period of a few seconds up to about 24 hours. As a result of such heat-annealing conditions, the individual fibers will retain their generally sinusoidal disposition thereby allowing removal from the winding jig WJ.

The positionally restrained fiber bundle B may thus be removed from the winding jig WJ in step 24 to allow the bundle B to be assembled within the module case C in step 26. In this regard, it will be appreciated that, since continuous lengths of hollow fiber membranes were employed, then the loops of fibers formed at each end must be cut to thereby allow them to be placed within a respective branch of the tubular Y-connector $Y_1$ and $Y_2$. These Y-connectors $Y_1$ and $Y_2$ are then coupled to the central tube $C_c$ by means of the tube couplings TC.

The module 10 is then finished in step 26 for example by potting the terminal ends of the hollow fiber membranes within their respective branch of the Y-configured connectors $Y_1$ and $Y_2$, and conducting any needed quality control inspections. The finished module 10 is then packaged as appropriate and shipped to the customer.

Figure 4:
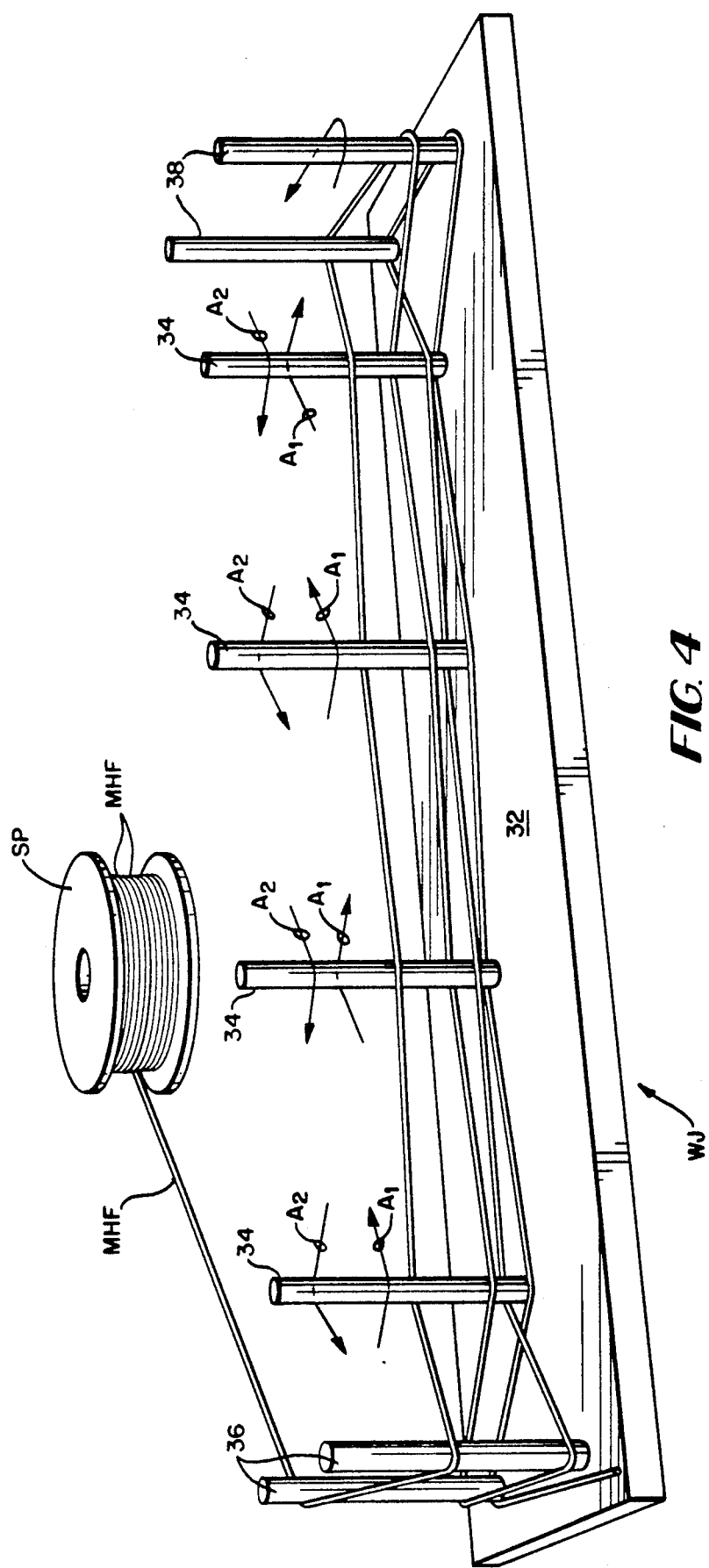
FIG. 4 is a diagrammatic perspective view showing the manner in the bundle of microporous hollow fiber is formed using a jig.

A schematic assembly of one preferred form of a winding jig WJ which may be used during the process of the present invention is shown in accompanying FIG. 4. As is seen, the winding jig WJ includes a baseboard 32 and a number of center-posts 34 aligned along the lengthwise axis of the baseboard 32 and extending upwardly therefrom. Pairs of end-posts 36, 38 are positioned at the respective ends of the baseboard 32. The individual end-posts 36, 38 are each axially and laterally spaced from the last center-post 34 near the end of the baseboard 32 so that each end-post pair 36, 38 establishes an upright plane which is essentially perpendicular to the upright plane established by the aligned center-posts 34.

Accompanying FIG. 4 also depicts in a schematic fashion the technique by which a continuous length of microporous hollow fiber MHF is wound along the paths established by means of the center-posts 34 and the pairs of end-posts 36, 38. As is seen, the continuous length of MHF, which will typically be supplied upon a spool SP, is wound in a back-and-forth manner about the center-posts 34. Only a single microporous hollow fiber is shown being supplied by the spool SP for clarity of presentation. It will be appreciated, however, that the process of the present invention will most preferably employ a multifilametary spool SP on which a number of individual continuous lengths of hollow fiber membranes are wound.

Relative manipulation of the winding jig WJ and/or spool SP (which may be accomplished manually or by suitable automated means) will cause the length of microporous hollow fiber MHF to be alternately wound about the center posts 34 in the manner shown by the arrows $A_1$. The microporous hollow fiber MHF will then be wound about each of the end posts 38 and will then again be wound about the center-posts 34 but in the direction of arrows $A_2$. It will be observed that the directions of arrows $A_1$ and $A_2$ are opposite to one another so that the microporous hollow fiber is alternately disposed on one and the other sides of each center-post 34, respectively. The microporous hollow fiber MHF is then sequentially wound about the end-posts 36 and the above-described winding procedure repeated until the desired number of hollow fiber lengths are present between the end-post pairs 36, 38.

It will be appreciated that the crossing regions CR will be established between adjacent ones of the center-posts 34. Thus, the hollow fiber membranes at these crossing regions may be banded together at the crossing regions so as to positionally restrain the now formed fiber bundle upon the winding jig WJ as has been described previously. As was also described previously, the entire winding jig WJ may alternately be placed in a heat-setting over so as to heat-set the hollow fiber membranes in the configuration established by the jig. The hollow fibers may be severed at locations between each of the individual end-posts 36 and 38 so as to then provide terminal fiber ends. Removal of the fiber bundle B and placement within the module case C will thus complete the assembly procedure.

It will be appreciated that the particular geometry of the module 10 described above is only illustrative in that it represents a particularly preferred embodiment of this invention. Those in this art will recognize that the reduced EMT that ensues by virtue of the fabrication techniques of the present invention may have applicability in other end-use applications in which hollow fiber membranes are employed.

Further understanding of the present invention will be obtained from the following non-limiting Example.

EXAMPLE

A contained liquid membrane (CLM) module according to this invention was evaluated for the effective membrane thickness (EMT) using the procedures described in the publication entitled "A Two-Dimensional Analysis of Membrane Thickness in a Hollow-Fiber-Contained Liquid Membrane Permeator", Majumdar et al., Journal of Membrane Science, vol. 43, pages 259-276 (1989) (the entire content of which is expressly incorporated hereinto by reference) using carbon dioxide gas and a water membrane liquid. The EMT for a conventional module was also determined using the same technique. The results appear in Table 1 below.

TABLE 1

| Module Parameter | Invention | Prior Art Module |
|---|---|---|
| Fiber O.D. ($\mu$) | 300 | 300 |
| Packing Density (%) | 20 | 28 |
| EMT, Actual (cm) | 0.036 | 0.170 |
| ENT, Theoretical (cm) | 0.034 | 0.027 |
| Standardized EMT (%)* | 6% | 530% |

Notes:
*Standardized EMT = 100 × (EMT$_{act.}$−EMT$_{theor.}$)/EMT$_{theor.}$

It will be observed that the EMT of the module according to the present invention was only 6% over its theoretical value, whereas comparable conventional module exhibited an EMT which was 530% over its theoretical value. Hence, the data above demonstrates that the modules according to the present invention would have significantly better performance efficiencies in contained liquid membrane separations as compared to comparable conventional hollow fiber membrane modules.

While the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:
1. In a contained liquid membrane module comprising a module case and sets of hollow feed-fiber membranes and strip-fiber membranes each having an elongate dimension, each of the sets providing a path through which respective feed and strip fluids may flow, and positioned within an interior space of said module case, the improvement comprising:
   said sets of hollow feed-fiber membranes and strip-fiber membranes being disposed within said interior space of said module in a mutually opposed generally sinusoidal arrangement to each other, wherein respective ones of said feed-fiber membranes are interposed between an adjacent pair of said strip-fiber membranes, and wherein
   said opposed generally sinusoidal arrangement of feed-fiber membranes and said strip-fiber membranes establishes, relative to the elongate dimension of said feed-fiber and strip fiber membranes, generally lengthwise-separated and generally registered regions at which the feed-fiber and strip-fiber membrane cross one another.

2. An improved module as in claim 1, wherein said module case has respective supply and discharge ports for each of said feed-fiber membranes and strip-fiber membranes, and wherein terminal end portions of said feed-fiber membranes and said strip-fiber membranes are separated from one another and disposed within said respective supply and discharge ports.

3. An improved module as in claim 1, wherein said hollow fiber membranes are formed of a polyolefin resin.

4. An improved module as in claim 1, wherein said hollow feed-fiber membranes and strip-fiber membranes are heat-set in said generally sinusoidal arrangements.

5. An improved module as in claim 1, wherein said hollow feed-fiber membranes and strip-fiber membranes are positionally restrained by means of bands which encircle said fiber membranes about said lengthwise-separated crossing regions.

6. A method of making a contained liquid membrane module which comprises a dense plurality of hollow fiber membranes comprising the steps of:
   forming a bundle of hollow fiber membranes having a loop at each end by disposing at least one continuous length of hollow fiber membrane along generally opposing generally sinusoidal arrangements to establish lengthwise-separated and generally registered regions where a portion of said continuous length of hollow fiber membrane alternately crosses another portion thereof;
   positionally restraining said bundle of hollow fiber membranes at least at said regularly spaced lengthwise-separated crossing regions;
   severing the loops formed at each end of the formed bundle of hollow fiber membranes; and then
   assembling said positionally restrained bundle of hollow fiber membranes within a module case.

7. A method as in claim 6, wherein said step of forming a bundle of hollow fiber membranes includes concurrently disposing several continuous lengths of hollow fiber membranes along said generally opposing generally sinusoidal arrangements.

8. A method as in claim 6, wherein said step of positionally restraining said bundle includes heat-annealing said bundle.

9. A method as in claim 6, wherein said step of positionally restraining said bundle includes encircling said fibers about said lengthwise-separated crossing regions using one or more bands.

* * * * *